United States Patent
Stranberg et al.

(10) Patent No.: US 7,057,308 B2
(45) Date of Patent: Jun. 6, 2006

(54) BATTERY CONNECT/DISCONNECT FOR AN UNINTERRUPTIBLE POWER SUPPLY

(75) Inventors: John D. Stranberg, Boston, MA (US); Brian McKenna, Attleboro, MA (US); Joseph Goodfellow, Galway (IE)

(73) Assignee: American Power Conversion Corporation, West Kingston, RI (US)

( * ) Notice: Subject to any disclaimer, the term of this patent is extended or adjusted under 35 U.S.C. 154(b) by 323 days.

(21) Appl. No.: 10/137,202

(22) Filed: Apr. 30, 2002

(65) Prior Publication Data

US 2003/0201672 A1 Oct. 30, 2003

(51) Int. Cl.
*H02J 3/00* (2006.01)

(52) U.S. Cl. ...................................... 307/66
(58) Field of Classification Search ............... 307/66
See application file for complete search history.

(56) References Cited

U.S. PATENT DOCUMENTS

| 4,776,277 A | * | 10/1988 | Fiedler et al. | 102/293 |
| 5,401,924 A | * | 3/1995 | Armanno, Sr. | 200/244 |
| 5,404,090 A | * | 4/1995 | Shinbori | 307/66 |
| 5,993,225 A | * | 11/1999 | Johnson et al. | 439/136 |
| 6,147,471 A | * | 11/2000 | Hunter | 320/105 |
| 6,489,561 B1 | * | 12/2002 | Ziegler et al. | 174/72 A |
| 6,795,322 B1 | * | 9/2004 | Aihara et al. | 363/37 |

* cited by examiner

Primary Examiner—Robert L. DeBradinis
(74) Attorney, Agent, or Firm—Mintz, Levin, Cohn, Ferris, Glovsky and Popeo, P.C.

(57) ABSTRACT

An uninterruptible power supply (UPS) is provided that can alleviate difficulties in shipping electronic devices containing batteries, such as UPS devices by providing a battery connect/disconnect assembly that can connect and disconnect an internal battery from outside the chassis of the UPS. The UPS comprises an input, output, DC voltage source, electrical circuit, chassis, and connect/disconnect assembly. The input receives input power from an input power source, and the output provides output power to a load. The DC voltage source provides DC power and has first and second terminals. The electrical circuit is operably coupled to the DC voltage source and is capable of receiving the input power and providing the output power. The chassis houses at least the DC voltage source and the electrical circuit. The connect/disconnect assembly is operably coupled to the DC voltage source and is constructed and arranged to be operable from outside the chassis. The connect/disconnect assembly has a first state wherein the DC voltage source is operably coupled to the electrical circuit and a second state wherein the DC voltage source is operably disconnected from the electrical circuit.

33 Claims, 10 Drawing Sheets

BATTERY CONNECT/DISCONNECT FOR AN UNINTERRUPTIBLE POWER SUPPLY

FIELD OF THE INVENTION

Embodiments of the invention are directed towards a battery connect used with an electronic device having an internal energy source such as a battery, particularly an electronic device such as an uninterruptible power supply (UPS). More particularly, embodiments of the present invention are directed towards a UPS that complies with domestic and international shipping air regulations relating to battery disconnect during air shipment of an electronic device having a battery.

BACKGROUND OF THE INVENTION

An uninterruptible power supply (UPS) is a type of power supply used to power and protect an electrical load that is sensitive to fluctuations in or the absence of electrical power. The UPS can be connected between the load and a source of electrical power, such as a mains power source or other commercially provided electric power. The UPS uses commercially supplied AC power to charge a DC battery and provide the AC power to load. Upon outages of power, the load draws its AC power from the DC battery typically through a DC to AC inverter. This isolates the load from power surges or brownouts and also furnishes a source of power during brief outages.

Commonly, a UPS comprises a rectifier, inverter, battery charger, DC battery, and other components, all housed within a single case or package. FIG. 1 shows a typical prior art UPS 1 used to provide regulated uninterrupted power. The UPS 1 includes an input filter/surge protector 2, a transfer switch 3, a controller 4, a battery 5, a battery charger 6, an inverter 7, and a DC-DC converter 8. The UPS also includes an input 9 for coupling to an AC power source and an outlet 10 for coupling to a load.

The UPS 1 operates as follows. The filter/surge protector 2 receives input AC power from the AC power source through the input 9, filters the input AC power and provides filtered AC power to the transfer switch 3 and the battery charger 6. The transfer switch 3 receives the AC power from the filter/surge protector 2 and also receives AC power from the inverter 7. The controller 4 determines whether the AC power available from the filter/surge protector is within predetermined tolerances, and if so, controls the transfer switch to provide the AC power from the filter/surge protector to the outlet 10. If the AC power from the rectifier is not within the predetermined tolerances, which may occur because of "brown out," "high line," or "black out" conditions, or due to power surges, then the controller 4 controls the transfer switch 3 to provide the AC power from the inverter 7. The DC-DC converter 8 is an optional component that converts the output of the battery 5 to a voltage that is compatible with the inverter 7. Depending on the particular inverter 7 and battery 5 used the inverter 7 may be operatively coupled to the battery 5 either directly or through a DC-DC converter 8.

Electrical devices having installed batteries, such as UPS's have the potential to cause safety problems, even when the electrical device is not operating. For example, short circuits can occur in electrical devices during transport. These short circuits can present a fire hazard.

Another problem that can occur is where a component in circuitry connected to a battery during shipping develops a fault that causes it to generate heat. An example is a printed wiring board or electronic capacitor electrically connected to a battery during shipping, which can develop an internal fault through contamination, defect, or dendritic growth. Such conditions may result in the release of battery energy and may not cause protective fusing to actuate but have been know to give rise to high temperature and initiate afire. Moreover, the subsequent feeding of the fire by electrical energy of the battery may cause normally non-combustible materials such as printed wiring assemblies to burn.

Yet another concern is that electrical devices with installed batteries may pose risks other than those associated with the "chemical" hazard of electrolyte or other battery components, or the risk of short circuit. One important concern in this regard is the risk arising from the possible generation of a dangerous quantity of heat owing to the unintentional and uncontrolled release of energy stored within a battery. Heat evolution associated with such an energy release can affect the device itself, packaging materials or other adjacent cargo in such a way as to initiate fire, and/or generate smoke. Even without a short circuit condition existing, an unacceptable situation may arise when a component in circuitry connected to a battery becomes heated to a point where combustion is initiated in the component itself, or in nearby materials, including packaging materials.

In response to these concerns, organizations such as the United States Department of Transportation (USDOT), and the International Air Transport Association (IATA) have established regulations relating to the shipment of electrical batteries and battery-powered devices (see, e.g., IATA Regulations Special Provision A123 and USDOT Research and Special Programs Administration Notice No. 99). These regulations provide that electrical batteries and battery-powered devices must have their batteries protected from short circuits and/or insulated during transport. Because the batteries of many electrical devices are located inside the chassis of the devices, compliance with these regulations can be difficult, time-consuming, and error-prone.

SUMMARY OF THE INVENTION

One embodiment of the invention alleviates the aforementioned difficulties in shipping electronic devices containing batteries, such as UPS devices by providing a battery connect that can connect and disconnect an internal battery from outside the chassis of the electronic device.

In one embodiment, the invention provides an uninterruptible power supply (UPS) that provides power to a load, the UPS comprising an input, output, DC voltage source, electrical circuit, chassis, and connect/disconnect assembly. The input receives input power from an input power source, and the output provides output power to a load. The DC voltage source provides DC power and has first and second terminals. The electrical circuit is operably coupled to the DC voltage source and is capable of receiving the input power and providing the output power. The chassis houses at least the DC voltage source and the electrical circuit. The connect/disconnect assembly is operably coupled to the DC voltage source and is constructed and arranged to be operable from outside the chassis. The connect/disconnect assembly has a first state wherein the DC voltage source is operably coupled to the electrical circuit and a second state wherein the DC voltage source operably disconnected from the electrical circuit.

In at least one embodiment, the connect/disconnect assembly comprises first and second connect/disconnect terminals and a shunt. The first connect/disconnect terminal is operably connected to the electrical circuit. The second connect/disconnect terminal is operably connected to the second terminal of the DC voltage source and is electrically isolated from the first connect disconnect/terminal when the connect/disconnect assembly is in the second state. The shunt comprises an electrically conductive material and has a first position and a second position. In the first position, the shunt is operable to make an electrical connection between the first and second connect/disconnect terminals. In the second position, the shunt does not make an electrical connection between the first and second connect/disconnect terminals.

In some embodiments, the shunt may be disposed within a first insulating structure. In some embodiments, either or both of the first and second connect/disconnect terminals are disposed within a second insulating structure. In some embodiments the first and second insulating structures are constructed and arranged to mate with each other.

In one embodiment, the connect/disconnect assembly comprises a housing and a plug. The housing is sized to attach to a respective housing opening on the chassis and is constructed and arranged to hold a first terminal operably connected to the electrical circuit and a second terminal operably connected to the DC voltage source. The plug is constructed and arranged to mate with the housing and has a conductor capable of making an electrical connection between the first terminal of the housing and the second terminal of the housing when the plug is mated to the housing. In the first state the plug is connected to the housing, and in the second state the plug is disconnected from the housing.

Either or both of the first and second terminals can be attached to the housing and/or formed within the housing. Either or both of the housing and plug can comprise a dielectric.

In one embodiment, the invention provides an uninterruptible power supply (UPS) that provides power to a load, comprising an input, an output, a DC voltage source, an electrical circuit, and means for operably connecting a second terminal of the DC voltage source to the electrical circuit and disconnecting a second terminal of the DC voltage source from the electrical circuit. The input receives power from an input power source, and the output provides output power to a load. The DC voltage source provides DC power and has first and second terminals. The electrical circuit is operably coupled to the DC voltage source and is capable of receiving the input power and providing the output power. The chassis houses at least the DC voltage source and the electrical circuit.

In some embodiments, at least a portion of the means for operably connecting and disconnecting is located outside the chassis. In at least one embodiment, at least a portion of the means for operably connecting and disconnecting is located on the chassis. In some embodiments, the means for operably connecting and disconnecting is entirely or at least partially operable from outside the chassis.

In another embodiment, the invention provides, for a UPS contained within a chassis, the UPS comprising a DC voltage source having first and second source terminals and an electrical circuit having first and second circuit terminals that receive energy from the DC voltage source, a method of connecting and disconnecting a DC voltage source from the electrical circuit from outside the chassis. The first source terminal is coupled to a first receptacle terminal in a receptacle attached to the chassis, the receptacle having a first receptacle terminal and a second receptacle terminal, each receptacle terminal being accessible from outside the chassis. The receptacle in at least one embodiment may comprise at least in part an insulating material. The first circuit terminal is coupled to the second receptacle terminal. The second source terminal is coupled to the second circuit terminal. The first receptacle terminal is isolated from the second receptacle terminal, such that the DC voltage source is disconnected from the electrical circuit when the first receptacle terminal is isolated from the second receptacle terminal.

The first receptacle terminal can be coupled to the second receptacle terminal by providing a conductor located external to the chassis, the conductor constructed and arranged to electrically couple the first receptacle terminal to the second receptacle terminal, such that the DC voltage source is connected to the electrical circuit when the first receptacle terminal is coupled to the second receptacle terminal.

The conductor can be installed in a second structure formed at least in part from electrically insulating material, the second structure constructed and arranged to mate with the first structure. The first structure can be connected to the second structure by installing a tether to one of the first and second structures, the tether constructed and arranged to attach to the other of the first and second structures when the first and second structures are installed to the chassis.

The foregoing and other objects, aspects, features, and advantages of the present invention will become more apparent from the following detailed description of the invention when viewed in conjunction with the accompanying drawings.

BRIEF DESCRIPTION OF THE DRAWINGS

An understanding of the principles of the invention may be readily attained by reference to the following specification and the accompanying drawings in which.

The drawings are not necessarily to scale, emphasis instead generally being placed upon illustrating the principles of the invention.

DETAILED DESCRIPTION

Embodiments of the invention permit an energy storage device or power source located within an electrical device (e.g., located within a chassis) to be disconnected from and reconnected to other equipment within the chassis, without having to open the chassis. The ability to disconnect and reconnect internal energy storage devices as needed may provide improved energy storage performance (e.g., longer battery life) and enables the electrical device to meet shipping regulations.

Figure 1:
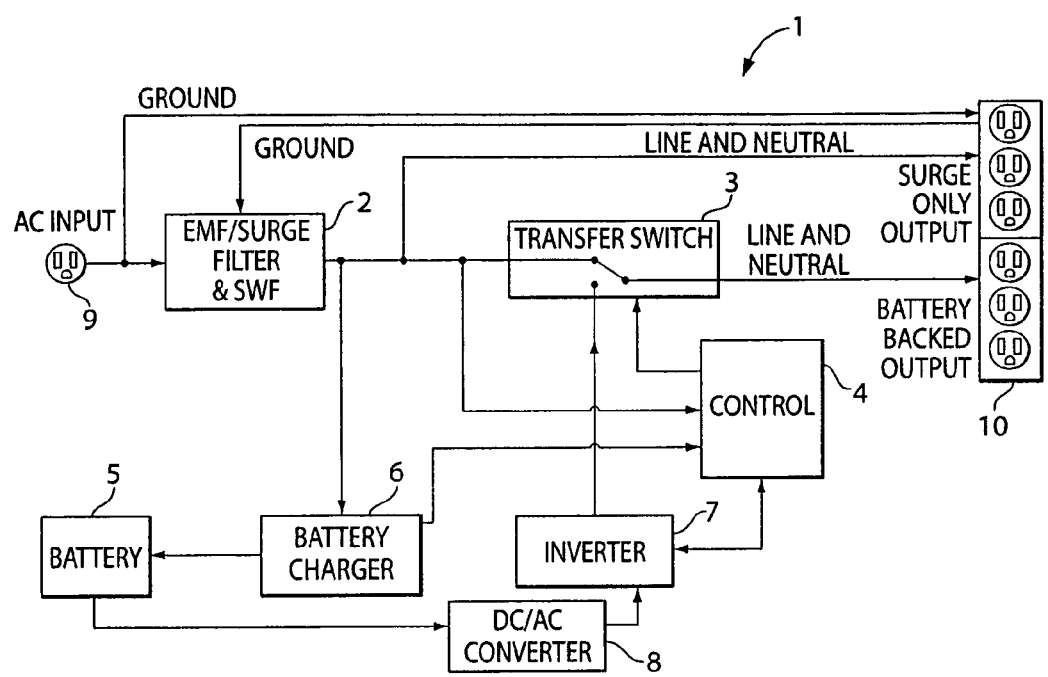
FIG. 1 is a block diagram of a typical uninterruptible power supply.

For example, one embodiment of the invention is used to disconnect and reconnect a battery 5 in the UPS device 1 illustrated in FIG. 1, from at least one other component that obtains energy from the battery, such as the inverter 7, or any on or more electrical circuits in the UPS. In at least one embodiment of the invention, the disconnection is done using a battery connect/disconnect assembly (described further herein), which is accessible to a user without requiring the user to directly contact the battery 5, such as by opening the chassis, housing, or other enclosure that contains the UPS device. In one embodiment, the battery connect/disconnect assembly is constructed and arranged to be operably coupled from outside the electronic device through the exterior (e.g., the chassis or enclosure) of the electronic device to the interior of the electronic device, so that the connect/disconnect operation may be performed manually, from a location accessible on or outside of the chassis or housing of the electronic device.

Embodiments of the invention will now be described. Although the embodiments are described in connection with the disconnection and reconnection of a battery in an uninterruptible power supply (UPS), those skilled in the art will appreciate that the invention has applicability in other types of electronic devices, including virtually any electrical/electronic device or electrical/electronic equipment having an energy storage device (e.g., a battery, capacitor, and the like) contained therein.

Figure 2:
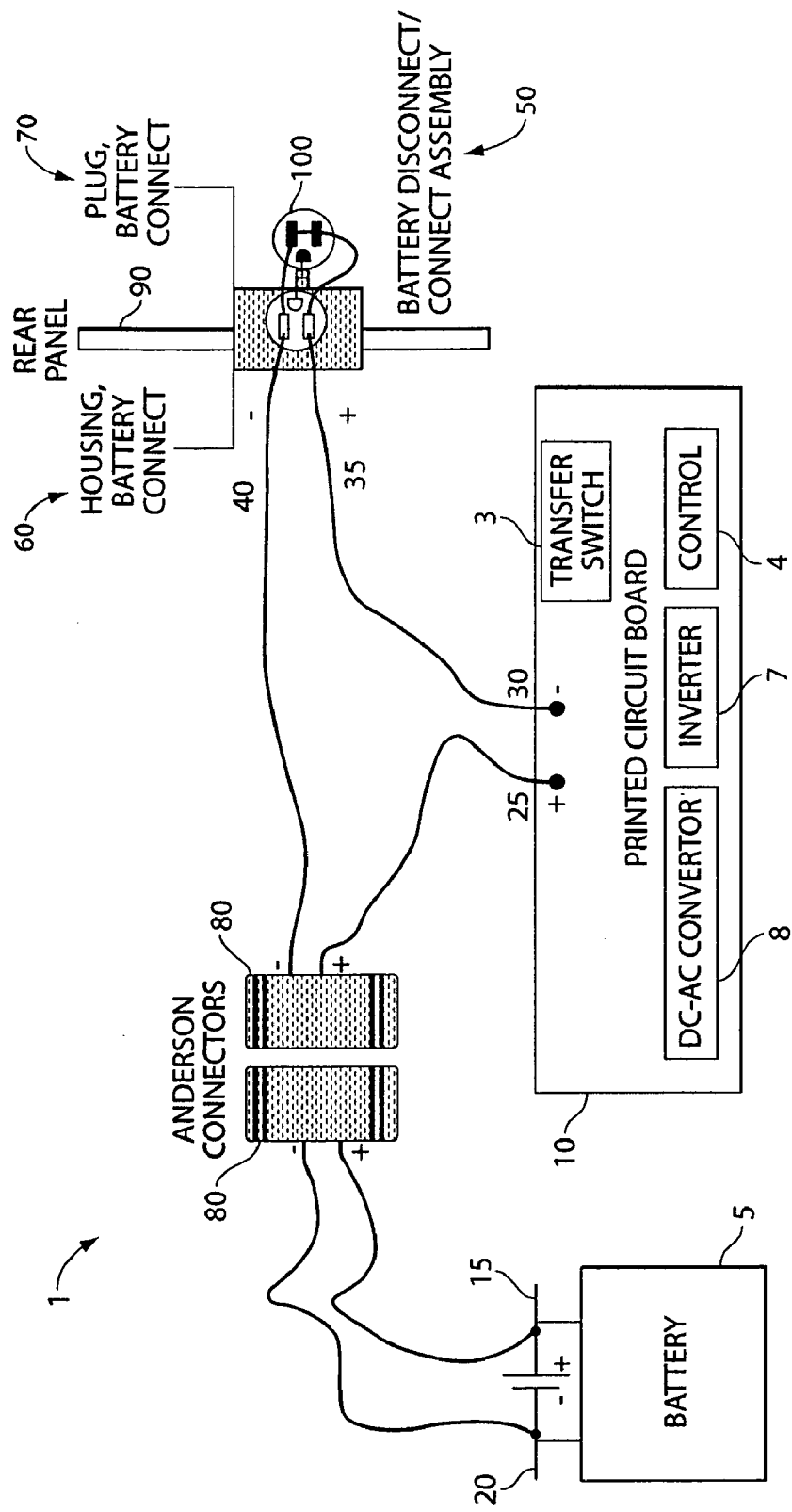
FIG. 2 is a battery connection schematic, in accordance with an embodiment of the invention.

FIG. 2 is a simplified block diagram schematic of a UPS 1 implementing an embodiment of the invention and showing the UPS 1 with a battery connect/disconnect assembly 50. The remainder of the UPS 1 may be similar to the UPS topology shown in the UPS 1 of FIG. 1, but also could have a different topology. The battery connect/disconnect assembly 50 provides a connect/disconnect feature for one terminal of the battery 5. The battery connect/disconnect assembly 50 comprises a housing 60 and a plug 70 that is constructed and arranged to mate with the housing 60. The housing 60 includes a first housing terminal 35 (also referred to herein as a "first battery connect/disconnect terminal") and a second housing terminal 40 (also referred to herein as a "second battery connect/disconnect terminal"). The plug 70 includes a shunt 100 that, when the plug 70 is mated to the housing 60, provides a short circuit between the first housing terminal 35 and the second housing terminal 40 in the housing 60. The appearance and construction of the battery connect housing are explained more fully in FIGS. 3–18 herein.

In the embodiment illustrated in FIG. 2, the battery connect/disconnect assembly 50 is disposed at the rear panel 90 of the chassis for the UPS 1, but that location is not limiting. The battery connect/disconnect assembly 50 can be located anywhere where it can be accessible to a user for connection and disconnection. Advantageously, the battery connect/disconnect assembly 50 is positioned so that it is easily viewable by a user to determine whether or not the battery connect/disconnect assembly is connected. In addition, in one embodiment the battery connect/disconnect assembly 50 is located so that it is accessible to a user during "set up" of the UPS 1, but is not positioned where the battery connect/disconnect assembly 50 might accidentally become disconnected during operation of the UPS 1. This location may vary depending on how the UPS 1 is oriented during operation and during transport. In some embodiments, it may be preferable to locate the battery connect/disconnect assembly on the top or front portion of a chassis, for example. In another example, the battery connect/disconnect assembly 50 may be positioned within an integrated compartment on the chassis of the UPS, which compartment may also have a cover or door for easy access (advantageously without tools) and/or viewing of the battery connect/disconnect assembly 50.

In FIG. 2, a first battery terminal 15 of the battery 5 (shown for illustrative purposes only as the positive terminal) is operably coupled to a first printed circuit board (PCB) terminal 25 on the PCB 10 that contains the electronic components of the UPS 1. A second PCB terminal 30 has a polarity opposite to that of the first PCB terminal 25. The PCB 10 is operably coupled via the second PCB terminal 30 to a first battery connect/disconnect terminal 35 of the battery connect/disconnect assembly 50. A second battery terminal 20 (which has a polarity opposite to that of the first battery terminal 15) is operably coupled to a second battery connect/disconnect terminal 40. In the embodiment shown in FIG. 2, first and second high power connectors 80 (such as those available from Anderson Power Products of Sterling, Mass.) are illustrated as part of the connections between the battery 5 and the other elements to which the battery is connected 5, but these additional connectors are not required in all embodiments of the invention. Incorporating additional connectors such as the high power connectors 80 may simplify the overall manufacture of the UPS 1.

Note that some embodiments of the invention can be implemented such that the polarities are the reverse of those shown in FIG. 2, as those skilled in the art will appreciate.

Referring again to FIG. 2, it can be seen that the first battery connect/disconnect terminal 35 and the second battery connect/disconnect terminal 40 are at the same polarity (which is shown for illustrative purposes only as negative polarity) and are connectable to form a short circuit that will connect the second battery terminal 20 to the second PCB terminal 30. This short circuit is provided by the shunt 100 in the plug 70. The battery connect/disconnect assembly 50, when in the "connected" state, thus operably connects the first battery connect/disconnect terminal 35 to the second battery connect/disconnect terminal 40 via the shunt 100 disposed in the plug 70, thereby operably connecting the battery 5 to the PCB 10, and permitting the UPS 1 to operate. When in the "disconnected" state (i.e., when the shunt 100 is not operably inserted to a degree sufficient to couple together the first and second housing terminals 35, 40), however, the battery connect/disconnect assembly 50 "breaks" the connection between both terminals of the battery 5 and the PCB 10, preventing electrical circuits on the PCB 10 from being energized.

In FIG. 2, the DC-AC converter 8, inverter 7, transfer switch 3, and control 4 are shown by way of illustration only as being disposed on a single PCB 10, to which energy from the battery 5 is routed. Of course, any one or more of the electrical components (DC-AC converter 8, inverter 7, transfer switch 3, and control 4) may be located on one or more other PCB's, or located by themselves. Moreover, the PCB 10 may include other or different circuits and/or components. For example, if the invention is used with an electronic device other than a UPS, the PCB 10 may comprise many different types of circuits. In addition, those skilled in the art will appreciate that the connections between the battery 5, PCB 10, and battery connect/disconnect assembly 50 may readily be adapted to multiple PCB's 10 and/or multiple batteries 5. These connections may also be adapted for multiple battery connect/disconnect assemblies 50.

Figure 3:
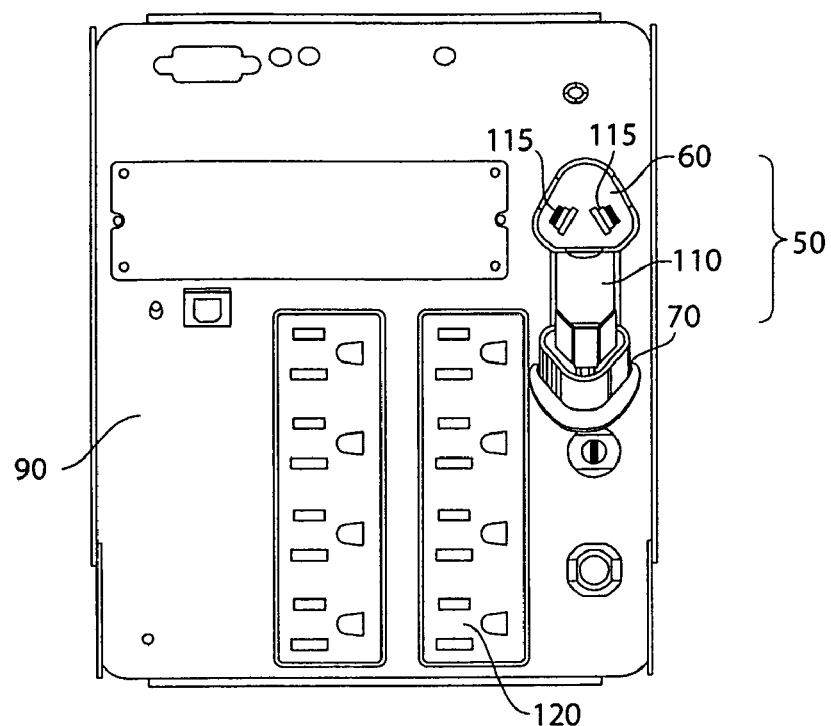
FIG. 3 is an illustration showing the placement of a battery connect/disconnect assembly into the rear panel of a first UPS, in accordance with one embodiment of the invention.
Figure 4:
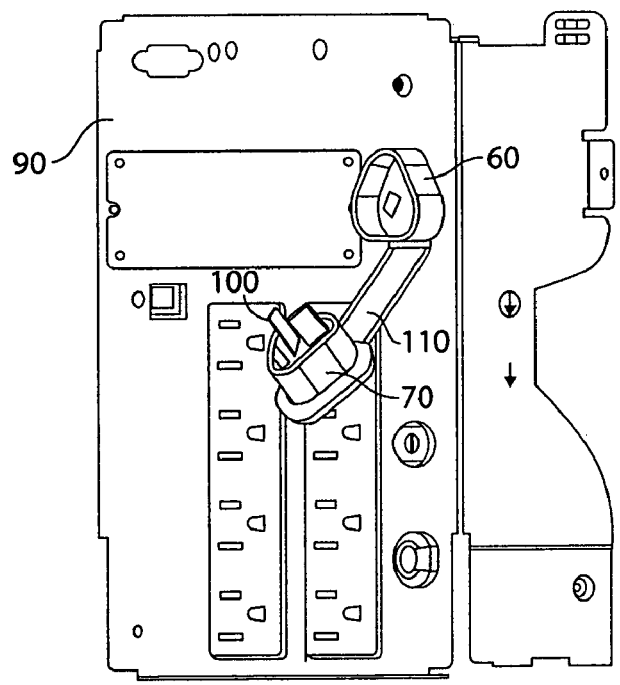
FIG. 4 is a perspective illustration of the battery connect/disconnect assembly of FIG. 3.

FIGS. 3 and 4 are illustrations of a front and perspective view, respectively, showing the arrangement of an embodiment of the battery connect/disconnect assembly 50 into the rear panel 90 of a first UPS 1, in accordance with one embodiment of the invention (the rear panel 90 shown in FIGS. 3 and 4 is provided for illustrative purposes only and is not limiting). In FIGS. 3 and 4, the battery connect/disconnect assembly 50 is in a "disconnected" state. As FIGS. 3 and 4 illustrate, the plug 70 and housing 60 of one embodiment have the shape of an equilateral triangle with rounded edges. The rounded triangular shape may help to minimize mounting space while maintaining ease of installation; however, in other embodiments virtually any shape of battery connect/disconnect housing 50 is usable.

Referring again to FIGS. 3 and 4, the battery connect/disconnect housing 50 includes a tether 110 that connects the plug 70 to the housing 60 to prevent loss of the plug 70. The tether 110 is sized to maintain orientation of the plug and to prevent the blades of the shunt 100 from being accidentally inserted into another opening on the panel, such as an AC output. The limited length of the tether 110, in one embodiment, also can help prevent the shunt 100 from accidentally short circuiting other UPS outputs or inputs. Similarly, in one embodiment, the tether 110 has a width wide enough to prevent rotation of the plug 70, to help prevent inadvertent short circuiting (e.g., accidentally having one of the blades of the shunt 100 contact a "live" UPS terminal (e.g., an AC output terminal) while the other blade contacts the chassis) to other UPS inputs and/or outputs. Tethering the plug 70 to the housing 60 also makes it easier for the user to be reminded that the plug 70 must be connected. As illustrated further herein in FIG. 7, the tether 110 is attached to the rear panel 90 and is "locked" in place when the housing 70 is installed, thereby locking both the plug 70 and the housing 60 in place without fasteners, saving assembly time and cost.

The shunt 100 of the plug 70 comprises a pair of angled blades that are made of a conductive material and joined within the plug 70. When the plug 70 is inserted into the housing 60, the blades of the shunt 100 enter blade openings 115 in the housing 60 to contact the first and second housing terminals 35, 40 (these features are illustrated in greater detail herein).

In the embodiment illustrated in FIGS. 3 and 4, the action mating the plug 70 to the housing may be as familiar to a user as plugging a conventional plug into a wall socket. Further, in at least one embodiment, the blade openings 115 in the housing 60 that receive the blades of the shunt 100 are configured (e.g., angled) so that it is very difficult for a user to "accidentally" insert an incorrect plug (e.g., a conventional plug) into the housing 60. Similarly, it will be difficult for a user to accidentally insert the blades of the shunt 100 into a receptacle, such as a wall outlet or the AC receptacles 120 on the chassis of the UPS 1.

Figure 5:
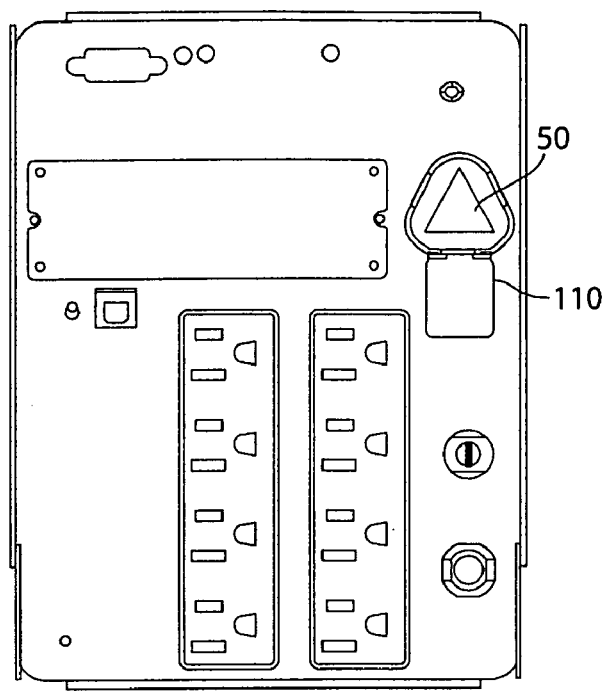
FIG. 5 is an illustration showing a battery connect plug of the battery connect/disconnect assembly fully connected to the battery connect housing, in accordance with one embodiment of the invention.
Figure 6:
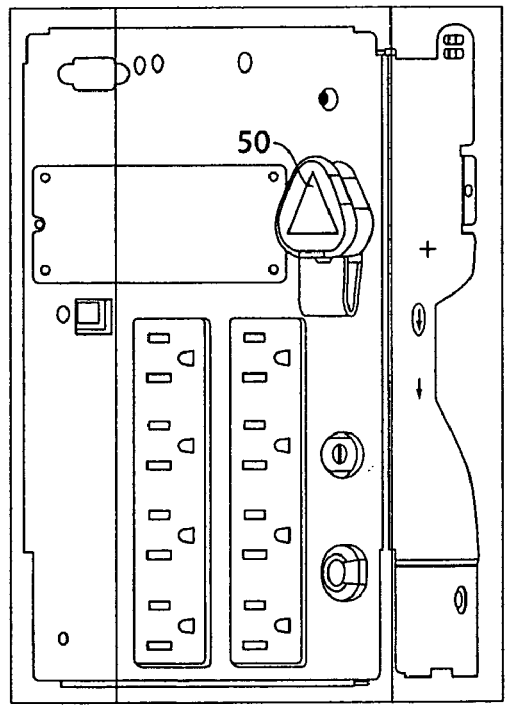
FIG. 6 is a perspective view of the illustration of FIG. 6.

FIGS. 5 and 6 are front and perspective views, respectively, of the battery connect/disconnect assembly 50 in a "connected" state. In the connected state, the blades of the shunt 100 are inserted into the housing 60 far enough to contact the first and second housing terminals 35, 40 and form a short circuit between them.

Figure 7:
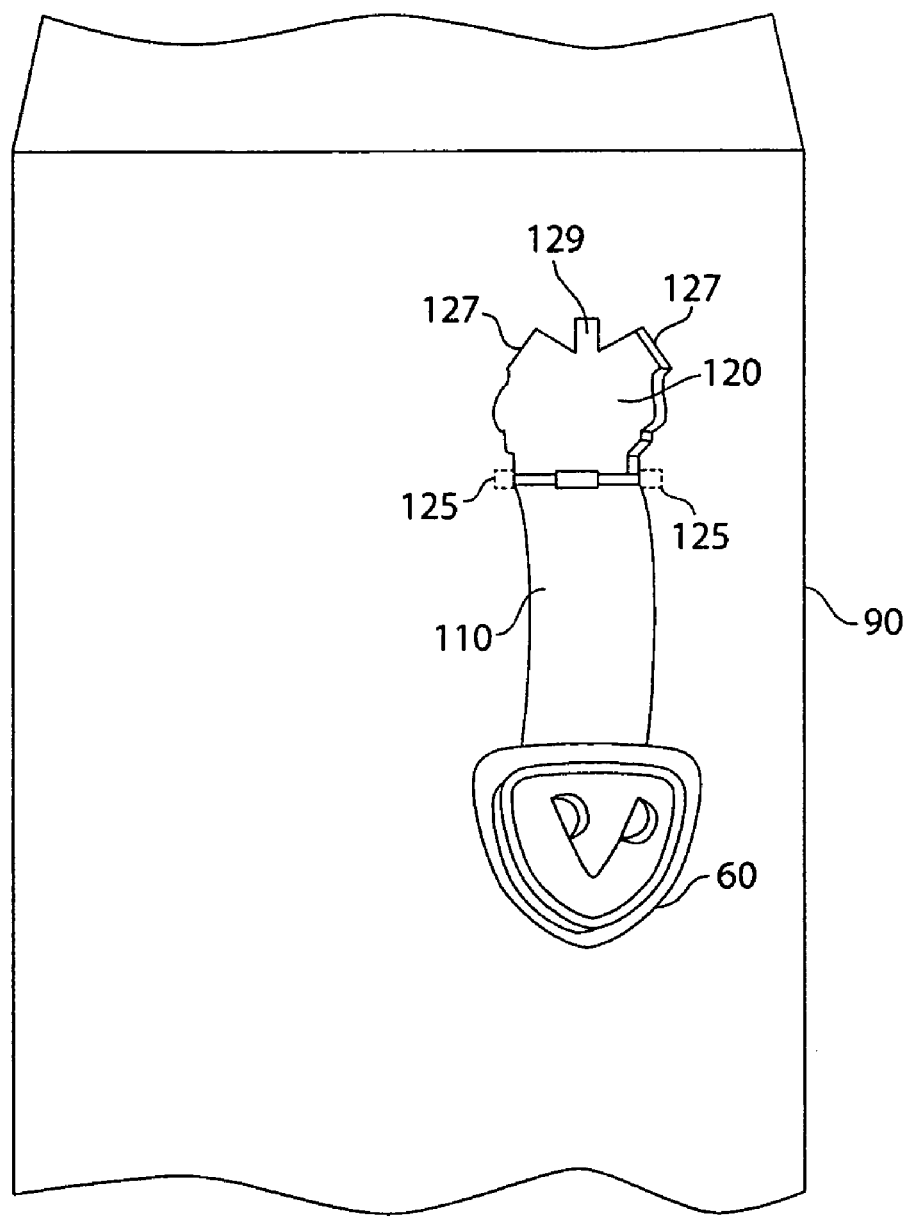
FIG. 7 is an illustration showing the rear panel of a UPS with the battery connect plug installed in an opening for receiving the battery connect housing, in accordance with one embodiment of the invention.

In at least one embodiment, the battery connect/disconnect assembly 50 snaps into the chassis of the UPS 1 and as a result does not require any fasteners, which saves assembly time and material cost. FIG. 7 is an illustration showing the rear panel of a UPS with an embodiment of the plug 70 installed in an opening 120 formed in the rear panel 90 of the chassis of the UPS 1. The tether 110 of the plug 70 includes protrusions 125 that are constructed and arranged to hold the plug 70 within the opening 20. The opening 120 is formed to mate with the shape and built-in connectors of the housing 60, and includes a key portion 129 and interlocking portions 127, which mate with respective features on the housing 60 (described in connection with FIG. 8). These features enable the housing 60 and plug 70 to be installed without additional fasteners. The particular shapes and orientations for the opening 120, housing 60, and plug 70 are provided by way of example only and are not limiting. Many other shapes of battery connect/disconnect assembly 50 and associated opening 120 (e.g., oval, circular, square, trapezoidal, irregular, etc.) are usable in accordance with the invention.

Figure 8:
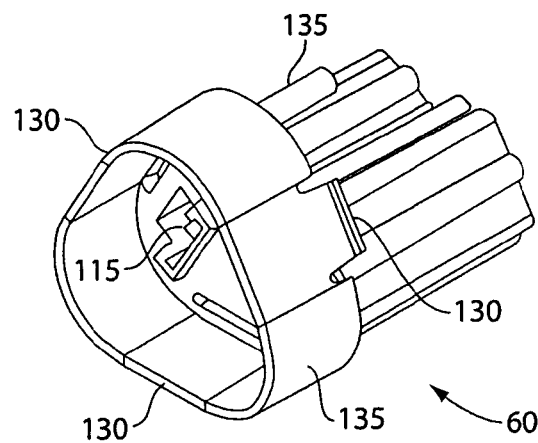
FIG. 8 is a right perspective view of a battery connect housing, in accordance with one embodiment of the invention.
Figure 9:
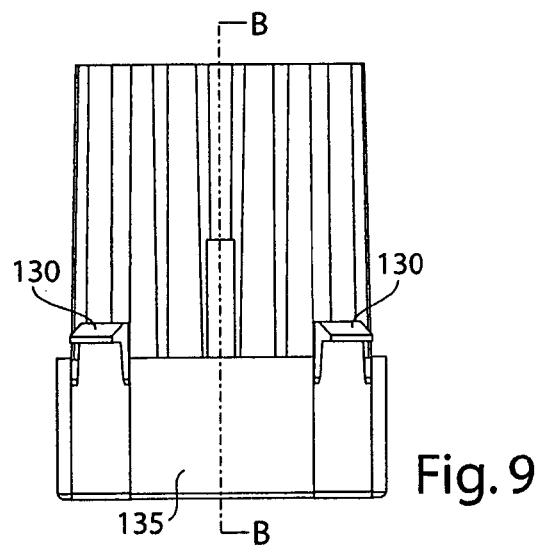
FIG. 9 is a view of the battery connect housing of FIG. 8, taken from the top.
Figure 10:
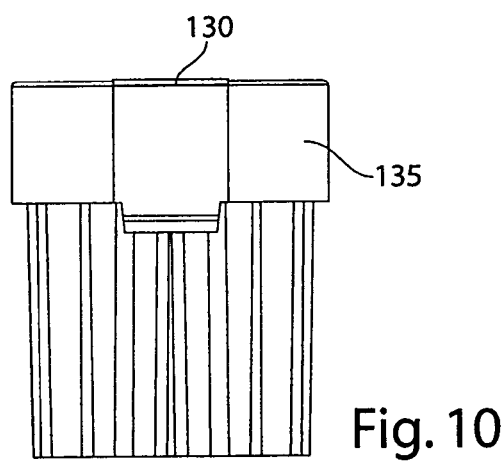
FIG. 10 is a view of the battery connect housing of FIG. 8, taken from the bottom.
Figure 11:
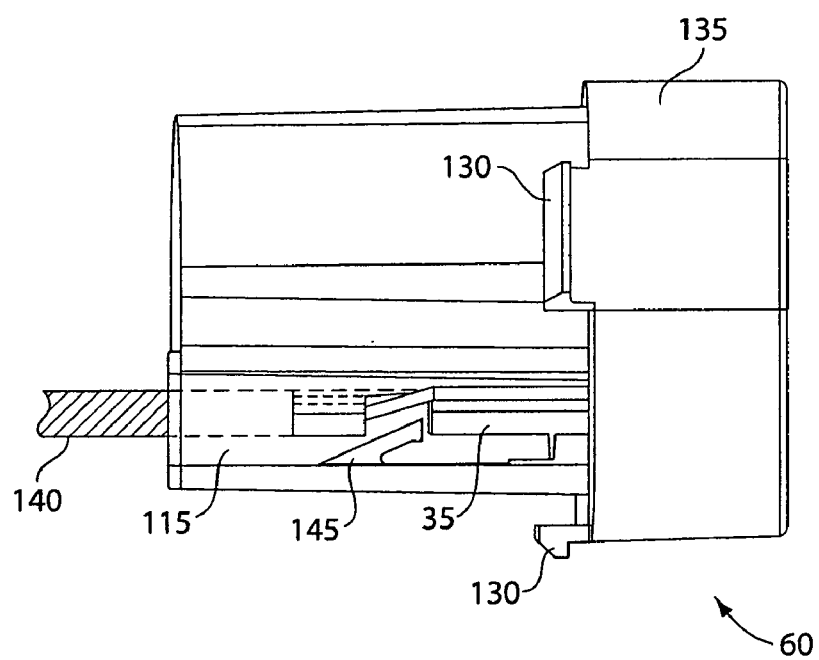
FIG. 11 is a front view of the battery connect housing of FIG. 8.
Figure 12:
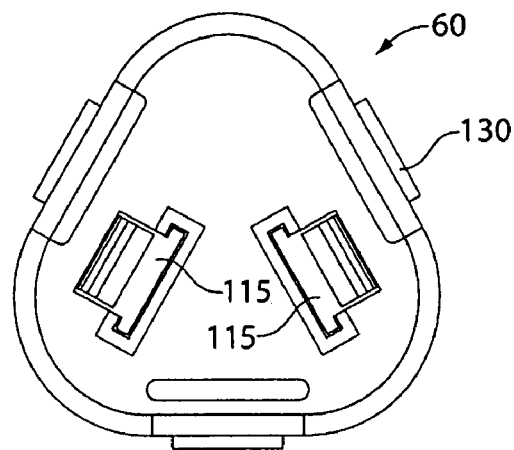
FIG. 12 is a rear view of the battery connect housing of FIG. 8.
Figure 13:
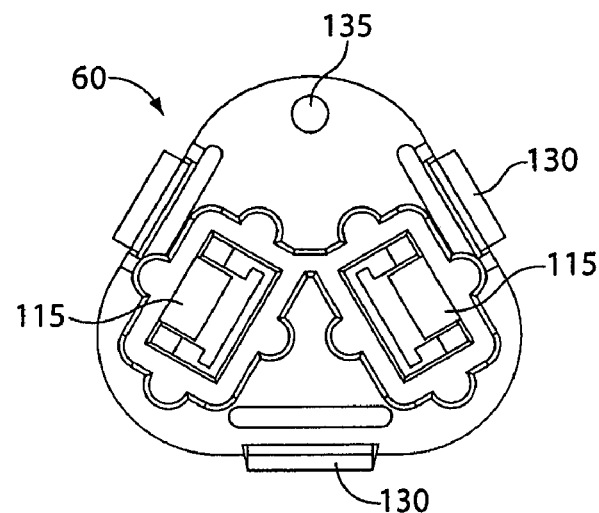
FIG. 13 is a partial right cross sectional view of the battery connect housing of FIG. 8, showing a wire assembly and terminal insert.

FIGS. 8, 9, and 10 are right perspective, top, and bottom views of the housing 60 of a battery connect/disconnect assembly 50, in accordance with one embodiment of the invention. FIG. 11 is described further below. FIGS. 12 and 13 are front and back views, respectively, of the of the housing 60 of the battery connect/disconnect assembly 50 of FIG. 8. The housing 60 is a structure formed from an electrically insulating material and holds first and second housing terminals 35, 40. In one embodiment, the housing 60 may be formed in a manner similar to a conventional electrical receptacle used to receive the prongs of a plug. The housing 60 includes a key 135 constructed and arranged to mate with the key portion 129 of the opening 120. The key 135 can improve ease of assembly. The housing 60 also includes three claws 130, which mate with the respective interlocking portions 127 in the opening 120. Thus, the housing 60 can "snap" into the opening 60 and be held in place without additional fasteners. The blade openings 115, formed in the housing 60 are constructed and arranged to receive the blades of the shunt 100 of the plug 70. The front portion 135 of the housing 60 acts as a shield against electrical arcing and accidental short circuits.

FIG. 11 is a partial right cross sectional view of the battery connect housing 60 of FIG. 8, showing connection of the first housing terminal 35 to the housing 60. Those skilled in the art will appreciated that showing the first housing terminal 35 as being on the right side of the housing 60 is provided by way of example only; in this embodiment, it is immaterial where on the housing the first housing terminal 35 is located, so long as the first housing terminal 35 is capable of mating to one of the blades of the shunt 100.

In one embodiment of the invention, the terminal 35 of the housing 60 is provided by inserting a wire assembly 140 having a terminal attached to one end into the rear side of the blade openings 115 in the housing 60. The wire assembly 140 connects the terminal 35 to the second PCB terminal 30 (FIG. 2). In one embodiment, the first housing terminal 35 is a push-on type terminal, such as a FASTON brand terminal, available from TYCO Electronics/AMP, of Exeter N.H. In FIG. 12, a projecting, flexible claw 145 contacts an opening formed in the terminal 35. When the terminal 35 (and wire assembly 140) is inserted into rear side of the blade opening 115 of the housing 60, the flexible claw 145 is deflected as the terminal 35 (e.g., the FASTON terminal) is installed. When the terminal 35 is fully located, the flexible claw 145 springs back into its original position behind the terminal 35 and locks the terminal 35 into the housing 60 and prevents withdrawal of the terminal 35.

Providing the first housing terminal 35 as a terminal at the end of a wire assembly that snaps into the housing 60 can help to simply assembly of the UPS 1; however, those skilled in the art will appreciate that there are many ways to provide a first housing terminal 35 (as well as a second housing terminal 45) in the housing 60 where the respective terminal is operably coupled to either the PCB 10 or the battery 5. For example, a terminal capable of receiving the blade of the shunt 100 may first be attached to the blade opening 115 in the housing 60 and the wire assembly 140 could be soldered, crimped, or otherwise attached to the terminal. In another embodiment, the blade opening 115 can be lined with a conductive material to form a terminal to which the wire assembly 140 can be operably coupled. Those skilled in the art will appreciate that many other configurations of wire and terminal are usable in accordance with the invention.

Figure 14:
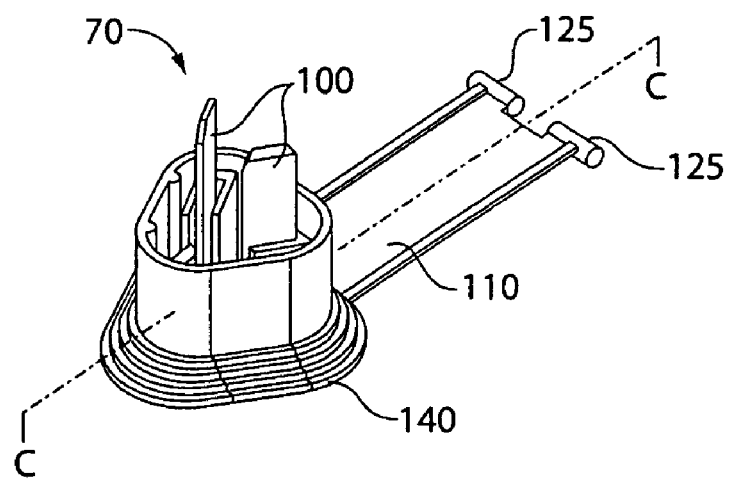
FIG. 14 is a perspective view of the battery connect plug, in accordance with one embodiment of the invention.
Figure 15:
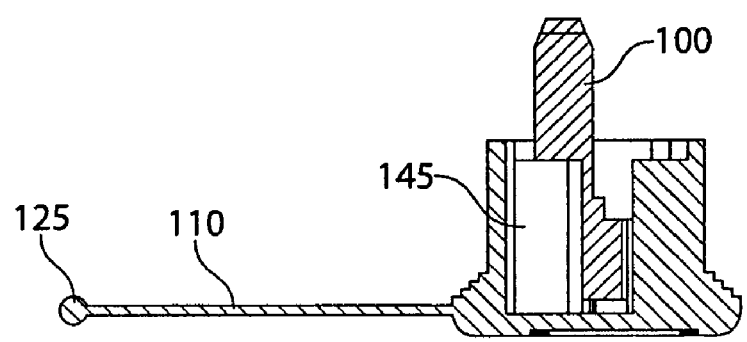
FIG. 15 is left cross-sectional view of the battery connect plug of FIG. 15, taken along the C—C line.

FIGS. 14 and 15 are perspective and cross-sectional views of the plug 70, in accordance with one embodiment of the invention. The cross-sectional view of FIG. 15 is taken along the C—C line of FIG. 14. The plug 70 and tether 110, in one embodiment, are fixedly attached. The plug 70 incorporates gripping features 140 to make it easier for a user to remove the plug 70 from the housing 60. In addition, the plug 70 includes internal partitions 145 that are constructed and arranged to hold the shunt 100 in place and to work with features provided on the shunt 100 (described herein) to prevent the shunt 100 from becoming dislodged during connection and/or disconnection of the plug 70 to the housing 60. The plug 70 forms an electrically insulating structure around the shunt 100.

Figure 16:
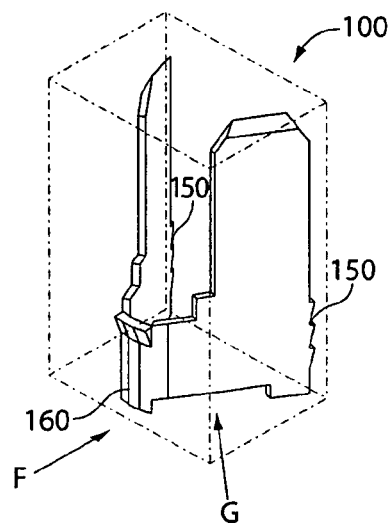
FIG. 16 is a perspective view of the blades of the battery connect plug of FIG. 15.
Figure 17:
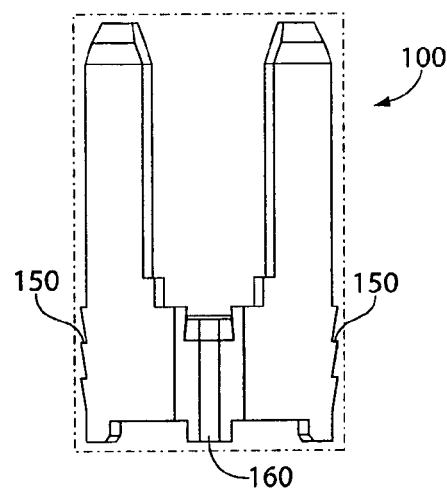
FIG. 17 is a view of the blades of the battery connect plug of FIG. 16 as seen from the direction of the F arrow in FIG. 16.
Figure 18:
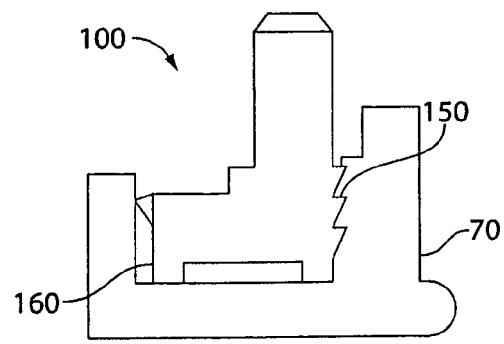
FIG. 18 is a cross sectional view showing how the shunt attaches to the battery connect plug 70 of FIG. 16.

The shunt 100 has a pair of blades that mate to the blade openings 115 in the housing 60. In one embodiment, the shunt is formed from a single piece of conductive material that is angled and cut to form blades. FIGS. 16, 17, and 18 are views of one embodiment of the shunt 100. FIG. 16 is a perspective view of the shunt 100, FIG. 17 is a view of the shunt, as seen from the direction of the F arrow in FIG. 16, and FIG. 18 is a cross sectional view showing how the shunt 100 attaches to the plug 70. Referring to FIGS. 16-18, each blade of the shunt 100 includes serrations 150 that provide an interference fit between the shunt 100 and the plug 70. The angling of the serrations help to lock the shunt 100 into the plug 70 during assembly and to further "lock" the shunt 100 during use, so that the shunt 100 is not dislodged during use. In addition, the shunt 100 includes a shunt claw 160 that also mates to a portion of the plug 70 to help lock the shunt 100 to the plug 70. Thus, the pair of serrations 150 and the shunt claw 160 provide a three-point press fit in to the plug 70.

The shunt 100 may be formed from any material capable of electrically connecting the first housing terminal 35 and the second housing terminal 40 when the plug 70 is inserted into the housing 60. Usable materials include, for example, conductive materials such as brass, silver, gold, copper, and materials plated with brass, silver, gold, copper, or other good conductors.

Although the illustrated embodiment of the plug 70 and housing 60 shows the shunt 100 as being a single conductor having a pair of "plug-like" blades mating to the blade openings 115 in the housing 60, the invention is not limited to this configuration. In one example, the shunt 100 can comprise a conductor, such as a piece of wire having appropriate terminals attached to each end, seated into a respective opening formed in the plug 70, which opening fixedly secures the shunt 100 in place during use. In another example, in one embodiment the housing terminals 35, 40 may be disposed close enough together to receive a shunt 100 having a single blade or conductor that is capable of electrically connecting the first and second housing terminals 35, 40. Further, the housing 60 in one embodiment may comprise a plurality of pairs of first and second housing terminals 35, 40 that are constructed and arranged to mate with a plurality of pairs of respective shunts 100 in a respective plug 70. Such an arrangement of multiple shunts and terminal pairs may be applicable in UPS devices having more than one battery and/or which have high current outputs.

Except for the conductive portions (i.e., at least the first and second housing terminals 35, 40, and the shunt 100), the housing 60, plug 70, and tether 110 of the battery connect/disconnect assembly 50, in one embodiment, can be formed from virtually any material capable of being formed into the desired shape. In one embodiment, the housing and the plug are formed from material capable of providing insulation against the current levels and/or heat generated in the UPS 1. For example, the housing, plug, and/or tether in some embodiments can be made using non-conductive material (e.g., a dielectric). Illustrative examples of usable materials include, nylon, engineering plastics, ceramics, synthetic rubber, composites, etc. For example, in one embodiment, the housing and plug are formed from a plastic (e.g., a thermoplastic) meeting a fire rating standard such the Underwriters Laboratories (UL) fire rating as 94V-0 and/or 94–5V and having a relative temperature index (RTI) of at least 85 degrees Celsius, with and without impact. Those skilled in the art will appreciate that many the connect/disconnect assembly may be made from any materials meeting regulatory and operational requirements for the electronic device.

In some embodiments, the housing, plug, and/or tether may be formed from a conductive material, but also have non-conductive portions. For example, in some embodiments, the housing, plug, or tether may be formed from a conductive and/or metallic material, such as copper, aluminum, or steel, that is partially or entirely coated, covered, or lined with a dielectric or another insulating material, such as TEFLON or plastic. Similarly, in some embodiments the shunt 100 can comprise both conductive and non-conductive portions, so long as the shunt 100 is able to operably couple the first and second housing terminals 34, 40 when the battery connect/disconnect assembly 50 is in the "connected" state". For example, in one embodiment a shunt 100 may be made using a piece of TEFLON coated wire having lugs, terminals, or blades attached to either end, with the plug 70 having recesses formed therein to receive and secure the shunt 100. Those skilled in the art will appreciate that virtually any combination of conductive and non-conductive materials is usable for the various parts of the battery connect/disconnect assembly 50 so long as the battery connect/disconnect assembly 50 can reliably and safely maintain the "connected" and "disconnected" states described herein.

At least one embodiment of the invention provides a UPS that is in compliance with the USDOT's Hazardous Materials Regulations and IATA regulations for battery disconnect and disconnect of energy storing devices during shipment. Using at least some embodiments of the invention, an end user is able to connect and disconnect the energy storage device of an electrical device from outside the chassis of the electrical device. In contrast, in some existing electronic devices, the user must open the battery compartment and physically connect and disconnect the battery (or other energy storage device). In at least some embodiments of the invention, however, whenever it is desired/required that the electronic device have its energy storage device be disconnected (such as during shipping or transport of the electronic device), the plug 70 is removed from the housing 60, thereby disconnecting the battery or other energy storage device from the internal electronics within the electronic device, and helping to reduce and/or eliminate the risk of electrical energy contributing to a fire caused by a short circuit or other fault in the electronics. In at least some embodiments of the invention, when the battery connect/disconnect is in the "disconnected" state, the plug 70 and/or the tether 110 can be physically secured to the chassis of the UPS 1, such as by a piece of tape, a tie wrap, a connector built-into the chassis, and the like, to further ensure that the battery connect/disconnect assembly remains in the "disconnected" state even when vibrations, bouncing, etc., occur.

Further, the design of the battery connect/disconnect of at least some embodiments of the invention makes it extremely unlikely that the battery connect/disconnect assembly could accidentally become "connected" during transport. This mechanical disconnect feature of at least some embodiments of the invention can be more advantageous and reliable than disconnecting the battery via an external switch, because there is the chance that the switch can unexpectedly switch to a connected state, with or without external vibrations, impacts, or contact. Moreover, the nature of the battery connect/disconnect assembly shown in at least some embodiments of the invention enables manufacturers and users to quickly and easily determine, by looking at the outside of the UPS 1, that the UPS is in a disconnected state.

Embodiments of the invention may provide several additional advantages. For example, the battery connect/disconnect assembly 50 in at least some embodiments has a configuration that has reduced mounting space and require minimal raw material for manufacture. In addition, the three point snap feature provided in one embodiment is relatively simple to assemble and may be easier to assemble than other known connectors because few, if any, fasteners are required. In one embodiment, no fasteners are required to assembly both the plug 70 and the housing 60 to the chassis of the electronic device. Having a snap fit may also minimizes the risk of an end user inadvertently removing the housing from the panel.

Although at least some of the embodiments described herein can be manufactured from a moldable material, such as a synthetic material, in a single forming step (e.g., injection molding) it should be understood that the battery connect/disconnect design in accordance with the principles of the invention could also be achieved by other manufacturing techniques capable of producing the respective parts of the battery connect/disconnect assembly 50 effectively, in a quick, simple, low-cost, or otherwise improved manner. For example, the battery connect/disconnect assembly 50 could be formed by milling, punching, filing, or cutting one or more of the respective parts of the battery connect/disconnect out of a solid material, such as a solid plastic material. It also should be understood that the battery connect/disconnect assembly 50 could be made using materials of biological or metallic origin that possess the desired mechanical and conductive or non-conductive qualities required for the respective part. Details of the above-described materials and the manufacturing methods are well known to those skilled in the plastics and materials arts and need not be disclosed herein in detail.

Further, although some embodiments of the invention have been described in connection with a UPS having an AC input and an AC output, the invention is not limited to any particular UPS topology. As those skilled in the art will recognize, the battery connect/disconnect assembly 50 of the invention can be used with UPS devices having one or more DC outputs, one or more AC outputs, one or more DC inputs, one or more AC inputs, and combinations of AC and DC outputs and inputs. Moreover, the invention is not limited to UPS devices and is usable with devices other than UPS devices. Many other articles of manufacture, including automobiles, power supplies, computers, consumer electronic devices, medical devices, power generation systems, etc., may include energy storage devices such as batteries and/or capacitors. If it is desired and/or required that the energy storage device of the respective article of manufacture be disconnected and reconnected, for any reason, especially during transport, at least some embodiments of the invention may be useful to accomplish the connection and disconnection.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. An uninterruptible power supply (UPS) that provides power to a load, the UPS comprising:
   an input to receive input power from an input power source;
   an output that provides output power to a load;
   a DC voltage source that provides DC power, the DC voltage source having first and second terminals;
   an electrical circuit coupled to the DC voltage source, the electrical circuit capable of receiving the input power and providing the output power;

a chassis for housing at least the DC voltage source and the electrical circuit; and a connect/disconnect assembly comprising:
  a first connect/disconnect portion; and
  a second connect/disconnect portion, the second connect/disconnect portion being configured to mate to the first connect/disconnect portion; and
  wherein the connect/disconnect assembly is coupled to the DC voltage source and constructed and arranged to be operable from outside the chassis, the connect/disconnect assembly having a first state wherein the DC voltage source is coupled to the electrical circuit through the connect/disconnect assembly and a second state wherein the DC voltage source is disconnected from the electrical circuit, the connect/disconnect assembly being coupled to the DC voltage source independent of whether the connect/disconnect assembly is in the first or second state, the connect/disconnect assembly being configured such that the first and second connect/disconnect portion are biased toward the second state.

2. The UPS of claim 1 wherein the connect/disconnect assembly further comprises:
  a first connect/disconnect terminal connected to the electrical circuit;
  a second connect/disconnect terminal that is electrically isolated from the first connect disconnect/terminal when the connect/disconnect assembly is in the second state, the second connect/disconnect terminal being connected to the second terminal of the DC voltage source; and
  a shunt with ends that protrude outwardly, the shunt comprising an electrically conductive material and operable to make an electrical connection between the first and second connect/disconnect terminals when in the first state and to not make an electrical connection between the first and second connect/disconnect terminals when in the second state.

3. The UPS of claim 2 wherein the connect/disconnect portion comprises a first insulating structure.

4. The UPS of claim 2 wherein at least one of the first and second connect/disconnect terminals is disposed within a second electrically insulating structure of the connect/disconnect assembly.

5. The UPS of claim 2 wherein the shunt is located outside of the chassis when in the second position.

6. The UPS of claim 2 wherein at least one of the first and second connect/disconnect terminals is located within the chassis.

7. The UPS of claim 2 wherein the second connect/disconnect terminal is connected to the electrical circuit independent of the state of the connect/disconnect assembly.

8. The UPS of claim 2 wherein the connect/disconnect assembly is electrically disposed between the first DC voltage source terminal and the electrical circuit.

9. The UPS of claim 2 wherein a first end of the shunt is disposed at an oblique angle relative to a second end of the shunt.

10. The UPS of claim 3 wherein the first and second insulating structures are constructed and arranged to mate with each other.

11. The UPS of claim 1 wherein the chassis has at least one panel and wherein at least a portion of the battery connect/disconnect assembly is attached to the panel.

12. The UPS of claim 1 wherein:
  the first connect/disconnect portion comprises a housing sized to attach to a respective housing opening on the chassis, the housing constructed and arranged to hold:
    a first terminal connected to the electrical circuit; and
    a second terminal connected to the DC voltage source; and
  the second connect/disconnect portion comprises a plug constructed and arranged to mate with the housing, the plug having a conductor capable of making an electrical connection between the first terminal of the housing and the second terminal of the housing when the plug is mated to the housing;
  in the first state the plug is connected to the housing and in the second state the plug is disconnected from the housing.

13. The UPS of claim 12 wherein at least one of the housing and plug comprises a dielectric.

14. The UPS of claim 12 further comprising a tether connected to the first and second connect/disconnect portion and configured to bias the first and second connect/disconnect portion apart.

15. The UPS of claim 12 wherein at least one of the first and second terminals is attached to the housing.

16. The UPS of claim 12 wherein at least one of the first and second terminals is formed within the housing.

17. The UPS of claim 1 wherein the electrical circuit is connected to the DC voltage source independent of the state of the connect/disconnect assembly.

18. The UPS of claim 1 wherein the input is connected to an input power source independent of the state of the connect/disconnect assembly.

19. The UPS of claim 1 wherein the first and second connect/disconnect portions are constructed in a male/female configuration.

20. The UPS of claim 1 wherein the second connect/disconnect portion comprises an elongated wall configured to mate with the first connect/disconnect portion.

21. An uninterruptible power supply (UPS) that provides power to a load, the UPS comprising:
  an input to receive power from an input power source;
  an output that provides output power to a load;
  a DC voltage source that provides DC power, the DC voltage source having first and second terminals;
  an electrical circuit coupled to the DC voltage source, the electrical circuit capable of receiving the input power and providing the output power;
  a chassis for housing at least the DC voltage source and the electrical circuit;
  means for connecting the second terminal of the DC voltage source to the electrical circuit and disconnecting the second terminal of the DC voltage source from the electrical circuit, the means for connecting and disconnecting being coupled to the second terminal of the DC voltage source independent of whether the second terminal of the DC voltage source is connected to the electrical circuit; and
  means for biasing the connecting means from connecting the second terminal of the DC voltage source to the electrical circuit.

22. The UPS of claim 21 wherein at least a portion of the means for connecting and disconnecting is located outside the chassis.

23. The UPS of claim 21 wherein at least a portion of the means for connecting and disconnecting is located on the chassis.

24. The UPS of claim 21 wherein the means for connecting and disconnecting is at least partially operable from outside the chassis.

25. The UPS of claim 21 wherein the means for connecting and disconnecting is entirely operable from outside the chassis.

26. The UPS of claim 21 wherein the means for connecting and disconnecting is operable without requiring access to any components within the chassis.

27. The UPS of claim 21 wherein the means for connecting and disconnecting is connected to the electrical circuit independent of whether the second terminal of the DC voltage source is connected to the electrical circuit.

28. The UPS of claim 21 wherein the means for connecting and disconnecting is electrically disposed between one terminal of the DC voltage source and the electrical circuit.

29. The UPS of claim 21 wherein the electrical circuit is connected to the DC voltage source independent of whether the second terminal of the DC voltage source is connected to the electrical circuit.

30. The UPS of claim 21 wherein the means for connecting is constructed in a male/female configuration.

31. In a UPS contained within a chassis, the UPS comprising a DC voltage source having first and second source terminals, an electrical circuit having first and second circuit terminals, a receptacle attached to the chassis, a plug, and a tether, the receptacle having first and second receptacle terminals, each of the first and second receptacle terminals being accessible from outside the chassis, the plug being configured to be mate with the receptacle, the electrical circuit being configured to receive energy from the DC voltage source, the first source terminal being coupled to the first receptacle terminal, the second source terminal being coupled to the second circuit terminal, a method of connecting and disconnecting the DC voltage source from the electrical circuit from outside the chassis, the method comprising:

coupling the first circuit terminal to the second receptacle terminal using the plug;

isolating the first receptacle terminal from the second receptacle terminal, the first receptacle terminal being coupled to the first source terminal independent of whether the first receptacle terminal is isolated from the second receptacle terminal;

and biasing the plug to inhibit mating with the receptacle using the tether;

wherein the first source terminal of the DC voltage source is disconnected from the electrical circuit when the first receptacle terminal is isolated from the second receptacle terminal.

32. The method of claim 31 further wherein the receptacle comprises a first structure formed at least in part from electrically insulating material.

33. The method of claim 32 further comprising:

installing the plug in a second structure formed at least in part from electrically insulating material, the second structure constructed and arranged to mate with the first structure.

* * * * *